May 8, 1956 C. H. MAHER 2,745,065

COUPLING FOR COAXIAL HIGH FREQUENCY TRANSMISSION LINES

Filed March 15, 1955 2 Sheets-Sheet 1

INVENTOR

Charles H. Maher

BY James H. Littlepage

ATTORNEY

May 8, 1956 C. H. MAHER 2,745,065

COUPLING FOR COAXIAL HIGH FREQUENCY TRANSMISSION LINES

Filed March 15, 1955 2 Sheets-Sheet 2

INVENTOR
Charles H. Maher

BY James H Littlepage

ATTORNEY

United States Patent Office 2,745,065

Patented May 8, 1956

2,745,065

COUPLING FOR COAXIAL HIGH FREQUENCY TRANSMISSION LINES

Charles H. Maher, Washington, D. C.

Application March 15, 1955, Serial No. 494,418

4 Claims. (Cl. 333—6)

This invention relates to couplers for coaxial high frequency transmission lines and, more particularly, to quickly attachable connectors for coupling a branch line to a continuing cable.

In apartment houses, retail stores and repair shops where a large number of television or frequency modulated receivers are fed from a main cable a number of problems arise from the use of direct electrical connectors between the signal input line of an individual subscriber and the transmission cable common to other receivers. The desired impedance in the connection between the main cable and the branch line must vary according to the location of the branch line along the length of the cable and also according to the number of branch lines fed by the cable. It is also desirable to adjust the impedance in the connection to certain individual receivers in order to reduce their output of interfering signals back into the main cable and, in addition, it is safer if the individual receivers be isolated from the main cable so as to prevent low frequency or direct current voltage from passing through the coupling. For these purposes it is intended now to provide a quickly attachable coupler wherein the center conductor of one coaxial cable is capacity coupled to the center conductor of another through a spaced pair of small conductor elements in an easily replaceable unit. The impedance of the unit depends on the size and spacing of the elements and, by providing bits of units with various electrical dimensions, the service man may quickly select and install or replace a unit to provide the optimum value for each special situation.

Another object of the invention is to provide, for small coaxial cables, a coupler which can be quickly installed without great skill while safeguarding the cable against mechanical deformation or appreciable weakening, and meanwhile assuring predictable electrical values in the main cable, coupling and branch line.

In one embodiment of the invention, the coupler is adapted for either outdoor or indoor use and is intended to provide a completely moisture-proof connection between a continuing coaxial cable and a coaxial branch cable arranged side-by-side within the coupler.

These and other objects, including the production of an inexpensive coupler formed mainly of molded plastic, capable of long life and re-use, occupying little space, creating little windage, immune to temperature changes, and unaffected by freezing, thawing or icing, will be apparent from the following specification and drawings, in which.

Figures 1, 2, 3, 4:
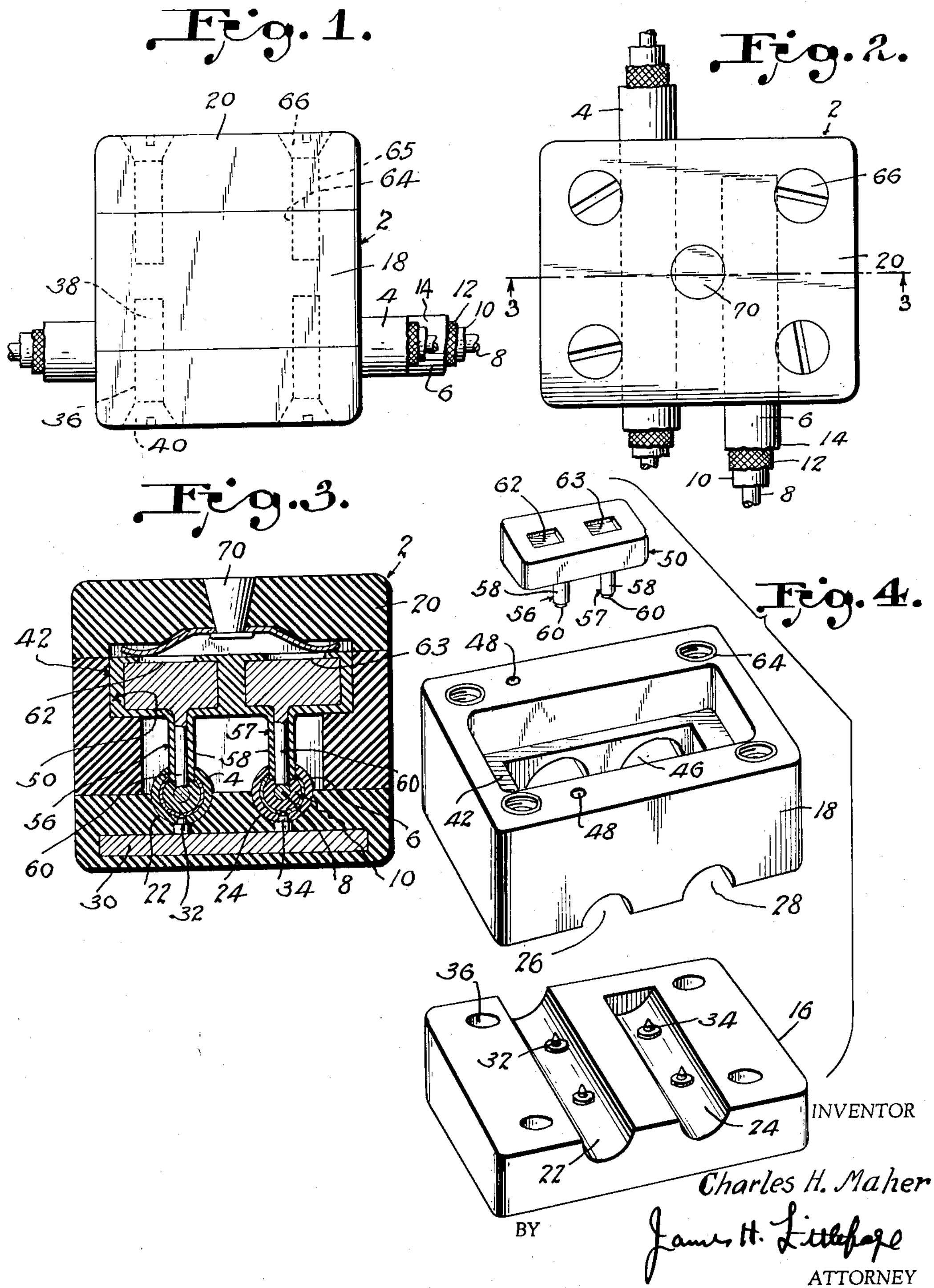
Fig. 1 is a side elevation of the embodiment of the invention intended primarily for outdoor use, showing the coupler installed on main and branch coaxial cables.
Fig. 2 is a plan view of the embodiment shown in Fig. 1.
Fig. 3 is a cross-section along the line 3—3 of Fig. 2.
Fig. 4 is an exploded view showing the base block, center block, and coupler unit.
Figure 5:
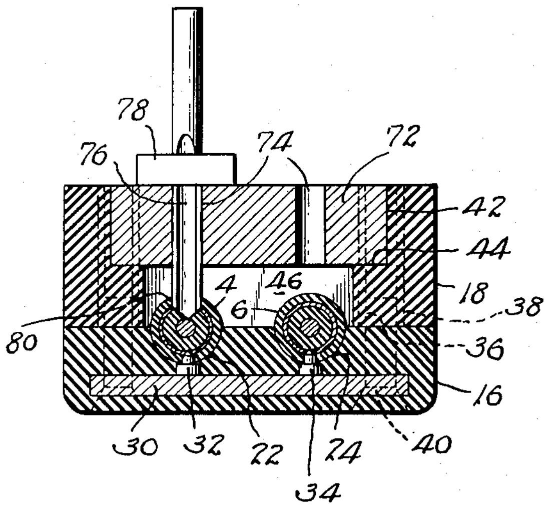
Fig. 5 is a cross section illustrating the center tapping stop.

Referring to the embodiment illustrated in Figs. 1 to 9, the coupler denoted generally at 2 is utilized for providing a capacity coupling between a continuing coaxial cable 4 and a branch coaxial cable 6. In one typical environment, continuing cable 4 leads from a master television antenna and extends downwardly along an exterior wall of a building, and branch cable 6 is one of many leading to individual receivers. Each cable includes a center conductor 8, surrounded by an insulating layer 10 of dielectric material, a braided metal shield 12, and an outer insulating sheath 14. The purpose of the invention is to capacity couple the inner conductors 8, and the shields 12 physically and electrically.

Coupler 2 is formed primarily of molded plastic dielectric material and built of separable base, intermediate and cap blocks 16, 18 and 20, respectively, closely fitting in stacked arrangement. As seen best in Figs. 4 and 9, base block 16 is formed with an open-ended groove 22 and an adjacent dead-end groove 24 in its upper face, while intermediate block 18 has similar open-ended and dead-end grooves 26 and 28, respectively, in its lower face for clamping over the continuing and branch cables so as to retain the cables snugly in close parallelism.

Molded interiorly in base block 16 is a metallic jumper plate 30 having integral spaced pairs of prongs 32 and 34 extending upwardly in grooves 22 and 24. As illustrated best in Figs. 3 and 5, prongs 32 and 34 are just long enough to tap the braided shields 12 of the cables clamped between blocks 16 and 18, and thereby provide between them a metallic conductive path via jumper plate 30. Smooth holes 36 in base block 16 register with threaded sockets 36 in intermediate block 18 so that when assembly screws 40 are tightened, tapping contact of prongs 32 and 34 with braided shields 12 is assured.

Figure 6:
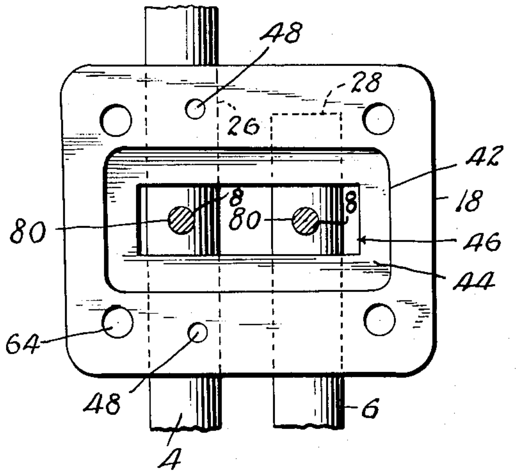
Fig. 6 is a plan view showing the center and base blocks installed on a pair of coaxial cables with tapping holes to the center conductors provided in readiness to receive the probes of the coupler unit.
Figure 9:
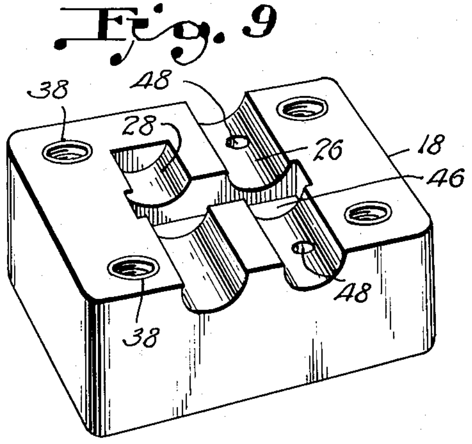
Fig. 9 is a perspective view showing the underside of the intermediate block.

Referring particularly to Figs. 4 and 6, intermediate block 18 has a rectangular well terminating at a horizontal ledge 44. The lower portion of well extends through the bottom of block 18, as indicated at 46, to provide access to the upper sides of cables 4 and 6. Passages 48 extend vertically through opposite sides of intermediate block 18 for utilization in a second embodiment described hereinafter.

Figure 7:
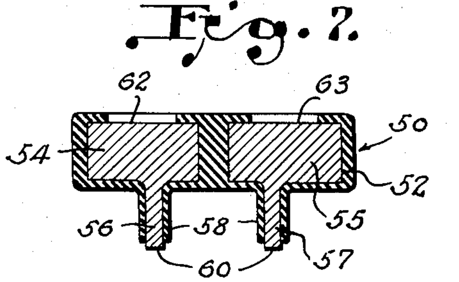
Fig. 7 is a cross sectional view through the capacity unit.
Figure 8:
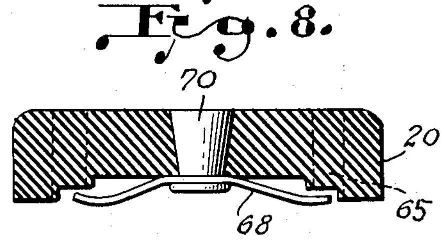
Fig. 8 is a cross sectional view illustrating the cap block.

Inner conductors 8 are non-metallically connected by a capacity coupler unit 50 detailed in Fig. 7 consisting of an oblong body 52 of dielectric plastic removably fitting in well 42 and resting on ledge 44. Molded within body 52 are spaced metallic slugs 54, 55 with depending metal probes 56 and 57, respectively. The lower ends of the probes are exposed as indicated at 60, but their sides have surrounding insulation 58. Upper surfaces of the metallic slugs are exposed, as denoted at 62 and 63 for use in the second embodiment.

Threaded sockets 64 in the top of intermediate block 18 receives screws 66 which pass through smooth holes 65, hold on cap block 20. As screws 66 are tightened down, a wing spring 68 held on the underside of cap block 20 engages the insulated portions of the upper side of capacity coupler 50 to hold the coupler firmly in place.

When installing the coupler base and bottom blocks are first mounted over cables 4 and 6, and a removable steel jig 72 having spaced holes 74 therethrough is dropped in well 42. A drill bit 76 having a stop collar 78 is then run down through holes 74 to drill out passages 80 exposing the center conductors 8 of the cables. After jig block 72 is removed, passages 80 may be inspected to see that center conductors 8 are exposed and that no strands of braided shield 12 have been dragged by the drill bit into passages 80. Thereafter, capacity coupler 50 is dropped into well 42 so that the exposed ends 60 of probes 56 and 57 respectively engage the center conductors 8 of cables 4 and 6. Cap block 20 in then installed, and the coupling is completed. In event more or less capacity in the coupling is desired, a capacity coupler with correspondingly larger or smaller slugs 54, 55 is selected from the various ones carried in an installer's kit.

The invention is not limited to the structure detailed hereinbefore, but is intended to cover all substitutions, modifications and equivalents within the scope of the following claims.

I claim:

1. A device for connecting inner and outer conductors of a coaxial branch line respectively to inner and outer conductors of a coaxial cable, comprising; a body of insulating material including a pair of blocks each having a spaced pair of grooves in the opposite faces thereof; the grooves in said blocks cooperating to receive said line and cable therein when said blocks are clamped together; means for clamping said blocks together; a metallic jumper plate in one of said blocks; metal prongs on said jumper plate, said prongs extending into the grooves for tapping outer conductors of said cable and line when said blocks are clamped together, whereby metallically to connect said outer conductors; the other of said blocks having a well therein, with the bottom of said well opening into said grooves; a coupler unit removably engaging in said well and including a spaced pair of metallic slugs separated by a dielectric and forming opposite plates of a capacitor; and insulated probes respectively connected to said slugs and extending through said opening said probes having exposed free ends for engaging inner conductors of said cable and line.

2. The combination claimed in claim 1, and a cover removably secured over said well for holding said coupler in said well.

3. The combination claimed in claim 1, said coupler unit comprising a body of insulating material in which said slugs are embedded and from which said probes extend.

4. The combination claimed in claim 1, and a drill jig removably fitting in said well, said jig comprising a block having drill-guide passage means therethrough whereby to center a drill bit vore the cables to be drilled out receiving the probes of said coupler unit.

References Cited in the file of this patent

UNITED STATES PATENTS

| | | |
|---|---|---|
| 2,694,182 | Edlen et al. | Nov. 9, 1954 |
| 2,694,183 | Edlen et al. | Nov. 9, 1954 |